United States Patent Office 3,270,027
Patented August 30, 1966

3,270,027
2-TRICHLOROMETHYL-4-THIAZOLIDONES
Alexander R. Surrey, Albany, N.Y., assignor to Sterling Drug Inc., New York, N.Y., a corporation of Delaware
No Drawing. Filed Oct. 15, 1963, Ser. No. 316,470
4 Claims. (Cl. 260—301)

This invention relates to compounds of the class of 4-thiazolidones.

The invention resides in the concept of chemical compounds having the structural Formula I

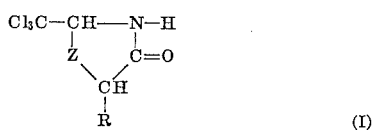

(I)

where R is hydrogen or lower-alkyl, and Z is —S—, >SO or >SO$_2$.

The term "lower alkyl," as used herein, e.g., as one of the meanings for R in Formula I, means alkyl radicals having from one to six carbon atoms and is illustrated by methyl, ethyl, n-propyl, isopropyl, n-butyl, 2-butyl, isobutyl, n-amyl, isoamyl, n-hexyl, 3-hexyl, and the like.

The 2-trichloromethyl-4-thiazolidones of Formula I where Z is —S— were prepared by heating a mixture of chloral hydrate, a 2-mercaptoalkanoic acid and ammonia or an ammonium salt that produces ammonia on heating. The preferred method was by heating in an inert solvent, such as dioxane, benzene or pyridine, a mixture of ammonium carbonate or ammonium acetate, a 2-mercaptoalkanoic acid having the formula HSCHRCOOH, and chloral hydrate, where R is lower-alkyl. Instead of ammonium carbonate or ammonium acetate, other salts of ammonia, preferably those with weak inorganic or organic acids that decompose readily when heated to produce ammonia can be used. Alternatively, ammonia can be used directly, for example, a solution of ammonia in methanol was found to produce satisfactory results. Still another procedure that can be used is the heating of chloral hydrate with the ammonium salt of said 2-mercaptoalkanoic acid. The foregoing procedures are carried out preferably in anhydrous medium, and with a continuous separator connected to the apparatus to remove water as it is formed by the reaction. However, use of the anhydrous conditions and the continuous separator is not necessary since the reaction will proceed in the presence of water, although the yield may be less in some instances.

The 2-trichloromethyl-4-thiazolidone-1-oxides of Formula I where Z is SO are prepared by oxidizing the corresponding trichloromethyl-4-thiazolidones. This oxidation is carried out by reacting the 4-thiazolidone with an oxidizing agent effective to oxidize sulfides to sulfoxides. Various oxidative procedures can be employed but the one preferred in practicing my invention comprises using a per-organic acid, e.g., peracetic acid, in a suitable solvent, e.g., ethyl acetate. The reaction is exothermic and is carried out preferably by mixing the reactants at a low temperature, i.e., from 0° C. to 10° C. Other oxidizing agents that can be used are other perorganic acids, e.g., perbenzoic acid.

The 2-trichloromethyl-4-thiazolidone-1,1-dioxides of my invention (Formula I where Z is SO$_2$) are prepared preferably by oxidizing the corresponding 2-trichloromethyl-4-thiazolidones (Formula I where Z is S). This oxidation is carried out by reacting the 4-thiazolidone with an oxidizing agent effective to oxidize sulfides to sulfones. Various oxidative procedures can be employed, but the one preferred in practicing my invention comprises using potassium permanganate in aqueous acetic acid solution. Other oxidizing agents that can be used include hydrogen peroxide, chromium trioxide (CrO$_3$), and the like. Also, the oxidation can be carried out using an excess of perorganic acid, e.g., peracetic acid, at about room temperature (20–25° C.) for several days. Alternatively, the 2-trichloromethyl-4-thiazolidone-1,1-dioxides can be prepared by oxidizing the corresponding 1-oxides (Formula I where Z is SO), using these same oxidizing agents effective to oxidize sulfides to sulfones, e.g., potassium permanganate, hydrogen peroxide, etc.

The chemical structures of my 2-trichloromethyl-4-thiazolidones and corresponding -1-oxides and -1,1-dioxides are established by the mode of their syntheses and corroborated by the correspondence of calculated and found values for the elementary analyses for representative examples.

The compounds of my invention have been tested by standard herbicidal evaluation procedures and found to have selective herbicidal activity against various noxious weeds, e.g., crabgrass, chickweed, curled dock, wild oats and pigweed, while having no activity against certain crops, e.g., corn, at the same application levels.

The following examples will further illustrate specific embodiments of the invention without, however, limiting it thereto.

*Example 1*

2-trichloromethyl - 4 - thiazolidone was prepared using ammonium acetate as the source of ammonia as follows: To a solution containing 66 g. of chloral hydrate and 300 cc. of dioxane was added a solution containing 30 cc. of thioglycolic acid and 33 g. of ammonium acetate whereupon the temperature rose from 30 to 35° C. and dissolution resulted. The reaction mixture was then heated on a steam bath under reflux for sixteen hours, cooled and filtered. The solid that was filtered off was washed with dioxane and ether and the washings were combined with the filtrate. The filtrate and washings were evaporated in vacuo to yield a residue which solidified on standing. The solid residue was broken up and shaken thoroughly with a small amount of ether (about 50 ml.) and about 300 cc. of water containing 30 cc. of concentrated ammonium hydroxide. The solid product was collected to yield 33 g. (37.5%) of 2-trichloromethyl-4-thiazolidone, M.P. 155–158° C. The product was recrystallized from 250 cc. of benzene using decolorizing charcoal to yield 24 g. of the product, M.P. 161–163° C. These 24 g. were combined with 8 g. of the product obtained using ammonia dissolved in methanol (preparation given below) and recrystallized from approximately 200 cc. of ethyl alcohol using decolorizing charcoal. There was thus obtained 22.3 g. of 2-trichloromethyl-4-thiazolidone. After drying for sixteen hours at 95° C., it melted at 166–167° C. (corr.) with decomposition.

*Analysis.*—Calcd. for C$_4$H$_4$Cl$_3$NOS: Cl, 48.24; S, 14.54. Found: Cl, 48.07; S, 14.73.

Following the above procedure but using in place of thioglycolic acid molar equivalent quantities of 2-mercaptopropionic acid, 2-mercaptobutanoic acid and 2-mercaptohexanoic acid, there are obtained, respectively, 5-methyl - 2-trichloromethyl-4-thiazolidone, 5-ethyl-2-trichloromethyl-4-thiazolidone and 5-n-butyl-2-trichloromethyl-4-thiazolidone.

2-trichloromethyl-4-thiazolidone was prepared using a solution of ammonia in methanol as follows: A mixture containing 33 g. of chloral hydrate, 15 cc. of thioglycolic acid, 300 cc. of dry benzene and 35 cc. of ammoniacal methanol (10% NH$_3$) was refluxed with a continuous separator connected to the reaction vessel for removal of water formed by the reaction. After one hour, 10 cc. of water had been collected and after fifteen hours, a total of only 11 cc. had been collected. The reaction mixture was cooled and the solid that separated was collected and shaken thoroughly with water containing 15 cc. of concentrated ammonium hydroxide and filtered. The residue was washed with water and ether to yield 7.5 g. of the product, M.P. 160° C. The ether layer of the filtrate was separated from the aqueous layer, dried over anhydrous magnesium sulfate, treated with decolorizing charcoal, filtered and evaporated to yield 2.5 g. of white solid, M.P. 151–155° C. The combined 9.8 g. of the product was recrystallized from about 125 cc. of benzene using decolorizing charcoal to yield 8 g. of the product, 2-trichloromethyl-4-thiazolidone, which was dried at 95° C. for four hours and found to melt at 160–162° C. As noted above, these 8 g. of the product were recrystallized together with the product obtained by the above procedure using ammonium acetate as the source of ammonia.

2-trichloromethyl-4-thiazolidone was also prepared using ammonium carbonate as the source of ammonia as follows: A mixture containing 25.0 g. of chloral hydrate, 7.2 g. of ammonium carbonate, 100 cc. of dioxane and 13.8 cc. of thioglycolic acid was heated on a steam bath with stirring overnight (about fifteen hours). The reaction mixture was decanted from a small amount of solid and evaporated in vacuo to remove the solvent. The residual oily material was dissolved in ether. The ether solution was washed with water containing ammonium hydroxide solution and evaporated to dryness. The residue was heated with benzene until no more water was removed azeotropically. The benzene solution was treated with decolorizing charcoal, filtered, and to the hot filtrate was added n-hexane. The solid that separated was collected to yield 4.5 g. of 2-trichloromethyl-4-thiazolidone, M.P. 157–160° C. Another 1.5 g. of 2-trichloromethyl-4-thiazolidone, M.P. 155–159° C. was obtained by addition of more hexane to the above filtrate. The total of 6.0 g. of product was used in Example 2.

*Example 2*

2-trichloromethyl-4-thiazolidone-1-oxide was prepared as follows. To a suspension containing 6.0 g. of 2-trichloromethyl-4-thiazolidone and 50 cc. of benzene chilled to 4° C. was added, with swirling, a solution containing 5.7 g. of 40% peracetic acid dissolved in 50 cc. of ethyl acetate also chilled to 4° C. The temperature rose to 20° C. and dissolution resulted. The reaction mixture was cooled again to 4° C. and then allowed to stand at room temperature for twenty-four hours. The reaction mixture was washed successively with aqueous sodium bisulfite solution and water, and then evaporated in vacuo to remove the solvent. The resulting solid was recrystallized from ethylene dichloride to yield 3.0 g. of the product, 2-trichloromethyl-4-thiazolidone-1-oxide, M.P. 179–181° C. A sample recrystallized from isopropyl alcohol had a corrected melting point of 178.2–179.8° C. with decomposition.

*Analysis.*—Calcd. for $C_4H_4Cl_3NO_2S$: N, 5.92; S, 13.53. Found: N, 6.18; S, 13.60.

Following the above procedure but using molar equivalent quantities of 5-methyl-, 5-ethyl- or 5-n-butyl-2-trichloromethyl-4-thiazolidone in place of 2-trichloromethyl-4-thiazolidone, there are obtained, respectively, 5-methyl-, 5-ethyl- or 5-n-butyl-2-trichloromethyl-4-thiazolidone-1-oxide.

*Example 3*

2-trichloromethyl-4-thiazolidone-1,1-dioxide was prepared as follows: To a stirred solution containing 27 g. of 2-trichloromethyl-4-thiazolidone dissolved in 100 cc. of glacial acetic acid and kept at about 15–20° C. was added a solution containing 28 g. of potassium permanganate in 800 cc. of water. The reaction mixture was decolorized by adding an aqueous solution of sodium bisulfite. The solution was allowed to stand in a refrigerator and the solid that separated was collected and recrystallized from 400 cc. of benzene using decolorizing charcoal to yield 11.5 g. of the product, 2-trichloromethyl-4-thiazolidone-1,1-dioxide, M.P. 162.5–163.4° C. (corr.).

*Analysis.*—Calcd. for $C_4H_4Cl_3NO_3S$: N, 5.55; S, 12.70. Found: N, 5.63; S, 12.82.

Following the above procedure but using molar equivalent quantities of 5-methyl-, 5-ethyl- or 5-n-butyl-2-trichloromethyl-4-thiazolidone in place of 2-trichloromethyl-4-thiazolidone, there are obtained, respectively, 5-methyl-, 5-ethyl- or 5-n-butyl-2-trichloromethyl-4-thiazolidone-1,1-dioxide.

The herbicidal activity of my compounds is illustrated by the following results obtained from both pre-emergent and post-emergent applications.

The results presented in Table A were obtained using acetone solutions of 2-trichloromethyl-4-thiazolidone (Example 1) and 2-trichloromethyl-4-thiazolidone-1,1-dioxide (Example 3), and applying the solutions to greenhouse flats containing the freshly planted seeds of various species (for pre-emergence) or to greenhouse flats containing two to three week old plants (for post-emergence; two week old plants in the summer and three week old plants in the winter). Samples of 200, 100, 50 and 25 mg. of compound per 10 cc. of solvent were used for pre-emergence, the quantities of compound being equivalent to 16, 8, 4 and 2 lbs. per acre, respectively. The post-emergent application was equivalent to 8 lbs. of compound per acre. Samples of the compounds were applied to corn and the listed weeds; and main observations and injury ratings were made 2½ to 3 weeks after pre-application and 7 to 10 days after post-application. Further observation was made as dictated by effects from treatment. The injury rating scale used was as follows:

TABLE A

| Plant specie | Example 1 |  |  |  |  | Example 3 |  |  |  |  |
|---|---|---|---|---|---|---|---|---|---|---|
|  | Pounds per acre |  |  |  |  | Pounds per acre |  |  |  |  |
|  | Pre |  |  |  | Post | Pre |  |  |  | Post |
|  | 2 | 4 | 8 | 16 | 8 | 2 | 4 | 8 | 16 | 8 |
| Corn | 0 | 0 | 0 | 2 | 0 | 0 | 0 | 1 | 3 | 2 |
| Wild Oats | 2 | 3 | 3 | 3 | 1+ | 2 | 3 | 4 | 3 | 2 |
| Cheat Grass | 2 | 3 | 4 | 3 | 1 | 2+ | 3 | 4 | 3 | 2 |
| Foxtail | 2 | 2 | 3 | 4 | 1 | 1 | 2 | 4 | 4 | 1 |
| Barnyard Grass | 1 | 2 | 2+ | 3 | 1 | 1 | 2 | 3 | 3 | 1+ |
| Crabgrass | 1 | 2 | 4 | 4 | 1 | 3 | 4 | 4 | 4 | 3 |
| Johnson Grass | 1 | 2 | 4 | 4 | 1+ | 1 | 2 | 2+ | 3+ | 2 |
| Yellow Rocket | 2 | 3 | 4 | 4 | 1+ | 1 | 2 | 3 | 3 | 3 |
| Chickweed | 4 | 4 | 4 | 4 | 1+ | 4 | 4 | 4 | 4 | 3 |
| Pigweed | 3 | 3 | 4 | 4 | 2 | 0 | 4 | 1 | 4 | 3+ |
| Velvet Leaf | 1 | 1+ | 3 | 4 | 1 | 0 | 1 | 1 | 1 | 2 |
| Lambsquarter | 2 | 2+ | 3+ | 4 | 3 | 1 | 3 | 3 | 4 | 4 |
| Curled Dock | 3 | 4 | 4 | 4 | 3 | 1 | 3 | 3 | 4 | 4 |

0—No injury.
1—Slight injury.
2—Moderate injury.
3—Severe injury.
4—Death (all plants killed).

The above data show the selective control of various weeds, e.g., crabgrass, chickweed, curled dock, etc., in plantings of corn.

The results for 2-trichloromethyl-4-thiazolidone-1-oxide (Example 2) in Table B were obtained as above but using only a 16 lb./acre pre-emergent application and using a different injury rating scale, i.e., from 0 to 10, with 0 representing no injury; 10 representing 100% injury (all plants killed); and, 1 to 9 representing from 10 to 90% injury.

TABLE B

| Plant specie | Example 2 | |
|---|---|---|
| | Pre 16 lbs./acre | Post 8 lbs./acre |
| Corn | 6 | 0 |
| Wild Oats | 3 | 6 |
| Cheat Grass | 7 | 0 |
| Foxtail | 5 | 0 |
| Barnyard | 2 | 0 |
| Crabgrass | 5 | 0 |
| Johnson Grass | 1 | 0 |
| Yellow Rocket | 1 | 1 |
| Chickweed | 2 | 2 |
| Pigweed | 10 | 6 |
| Velvet Leaf | 1 | 2 |
| Lambsquarter | 10 | 1 |
| Curled Dock | 5 | 0 |

On the basis of the quantities of compound used, the above data show the selective control of certain weeds, e.g., wild oats, pigweed, in plantings of corn using post-emergent application of the compound.

The compounds of my invention are prepared for herbicidal application by admixing a compound of the invention, e.g., 2-trichloromethyl-4-thiazolidone, with herbicidal adjuvant as carrier to provide compositions in liquid or solid form. Liquid compositions are prepared by admixing an active compound with conventional liquid diluent media; since the compounds are relatively insoluble in water, they are conveniently prepared in common organic solvents, e.g., acetone, ethanol, etc., or in mixtures thereof, with or without water. Solid compositions are prepared in the form of dusts or granules by admixing the active compound with finely divided solid carriers, e.g., talc, clay, silica, fuller's earth and pyrophyllite. Whether in the form of liquids or solids, the compositions may also include conventional surface active dispersing agents, e.g., sodium dodecylbenzenesulfonate, dibutylammonium dodecylbenzenesulfonate, polyoxyethylene sorbitan monooleate, etc.

I claim:
1. A compound of the formula

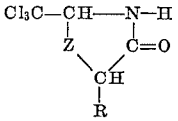

where R is a member selected from the group consisting of hydrogen and lower-alkyl, and Z is a member selected from the group consisting of —S—, >SO and >SO$_2$.
2. 2-trichloromethyl-4-thiazolidone.
3. 2-trichloromethyl-4-thiazolidone-1-oxide.
4. 2-trichloromethyl-4-thiazolidone-1,1-dioxide.

References Cited by the Examiner

UNITED STATES PATENTS

| 2,647,905 | 8/1953 | Surrey | 260—301 |
| 2,915,527 | 12/1959 | Campbell et al. | 260—307.3 |
| 2,973,366 | 2/1961 | Bimber | 260—307.3 |

OTHER REFERENCES

Bishop et al.: J. Chem. Soc. (London), 1963, pages 2381–2385.

Burger: Medicinal Chemistry (New York, 1960), pages 77–81.

HENRY R. JILES, *Acting Primary Examiner.*

NICHOLAS S. RIZZO, *Examiner.*

A. D. ROLLINS, *Assistant Examiner.*